Oct. 8, 1968  E. R. BARNETT ET AL  3,404,665
POWER UNIT
Filed July 19, 1966

EUGENE R. BARNETT
and WILLARD L. BARNETT,
INVENTORS

BY Robert A. Spray
ATTORNEY

United States Patent Office 3,404,665
Patented Oct. 8, 1968

3,404,665
POWER UNIT
Eugene R. Barnett, 6268 Windsor Drive 46219, and
Willard L. Barnett, 3367 W. Michigan St. 46222, both
of Indianapolis, Ind.
Filed July 19, 1966, Ser. No. 566,357
9 Claims. (Cl. 123—65)

ABSTRACT OF THE DISCLOSURE

A stepped-piston engine. Its inwardly-opening valve for the combustion chamber is urged open by supply pressure of fuel-air and urged closed by combustion chamber pressure and by biasing means, the latter being adjustable to effect valve-closure as desired, thus regulating preignition combustion chamber pressure. Check and relief valves regulate fuel-air pressure supplied to the valve, in spite of supply pressure variations such as caused by the nature of the fuel-air supply achieved by the supply cylinder of the engine. The valve carries its own ignition means, in a concavity of the valve surface.

---

Figures 1, 2:
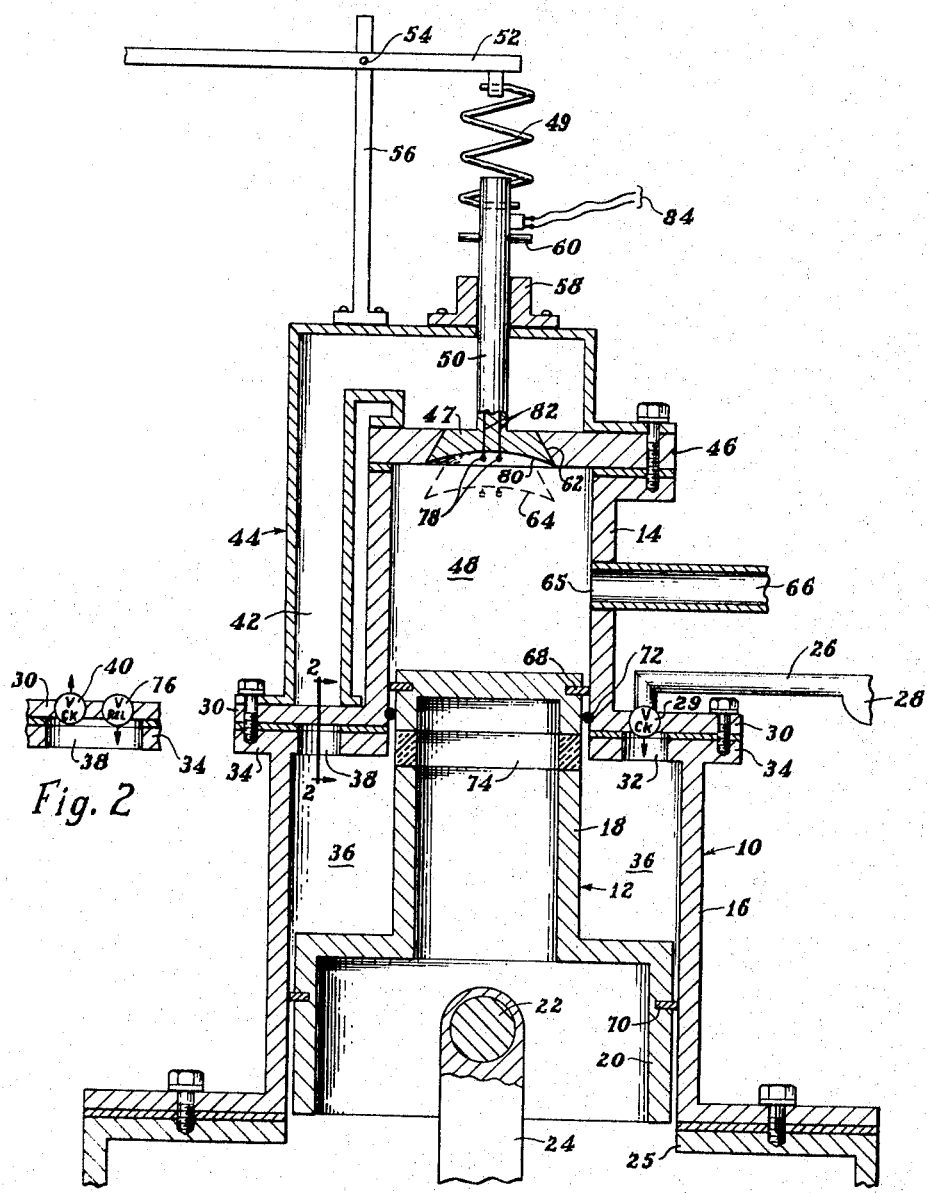

This invention relates to a power unit of an internal combustion engine, somewhat similar in several respects to that of the applicants' U.S. Patent No. 3,166,055.

More particularly, the present invention relates to a novel piston-type power unit which operates on a two-cycle principle; and its concepts provide a novel engine having a supercharged power stroke for each cycle, and provides other advantages detailed herein and inherent in the disclosed concepts.

In carrying out the invention in the illustrated embodiment, there is provided a stepped cylinder and a stepped piston, portions of each providing supply and power components respectively. On the upstroke, the fuel-air charge is forced upwardly to the region of an inwardly-opening valve of the combustion chamber in the power cylinder. The valve is provided with adjustable means providing valve-closing bias; and this adjustable means cooperates with pressure in the combustion chamber to effect valve-closure against the valve-opening pressure of the supplied fuel-air pressure, achieving desired control of preignition combustion chamber pressure. Novel and advantageous ignition means are also provided.

The above description is quite introductory and general; and the above and other objects, features, concepts, and advantages, which cooperate to provide the novel and advantageous overall invention, will further appear from the following detailed description of an illustrative embodiment of the invention, reference being had to the accompanying somewhat diagrammatic drawings, in which:

FIG. 1 is a cross-sectional view of the upper portion of an engine embodying the present invention; and FIG. 2 is a detail cross-sectional view thereof, taken generally as indicated by section-line 2—2 of FIG. 1.

As shown in the drawings, an engine or power means according to the present invention generally comprises a cylinder 10 and a piston 12 reciprocable therein. The cylinder 10 is shown as having a stepped configuration, providing a relatively smaller-diameter upper portion 14 and a relatively larger-diameter lower portion 16, the cylinder-portions being adjacent and concentrically aligned but axially spaced.

The piston 12 is likewise shown as of stepped configuration, providing a relatively smaller-diameter upper portion 18, and a relatively larger-diameter lower portion 20. The piston 12 is shown in bottom dead-center position, and is shown as including a piston pin 22 and a connecting rod 24, by which power is transmitted to a crank-shaft. The crank-shaft is not shown, nor is the major portion of the crank-case 25; but they may be of well-known nature, such as the form schematically indicated in FIG. 4 of the aforesaid prior patent.

As is now described, the upper cylinder 14 provides a "power" cylinder; and the lower cylinder 16 provides a "supply" cylinder.

Fuel-air charge, with lubricating oil also if desired, is admitted to the cylinder-portion 16 from a fuel-delivery tube 26 (having a suitable carburetor or other charge-nature adjustment-means indicated at 28) through a downwardly-opening check valve 29. The check valve 29, which desirably is of reed type, is shown as located in a lower flange 30 of the upper cylinder 14; and the fuel-air charge, after passing the valve 29, passes through an opening 32 in the wall 34 which provides the cylinder head for the lower cylinder 16, and into the annular supply zone 36 which exists exteriorly of the upper piston-portion 18 and interiorly of the cylinder-portion 16.

During the downstroke of the piston 12, the movement of the larger piston-portion 20 away from the cylinder head 34 draws in a fuel-air charge through the valve 29 and into that supply zone 36 of the larger cylinder 16.

During upstroke of the piston 12, the larger piston-portion 20 forces the fuel-air charge upwardly through another opening 38 in the cylinder head 34 of the lower cylinder 16, and upwardly through a check valve 40 located in the flange 30 of the upper cylinder-portion 14. This check valve 40 is desirably of a reed type, opening upwardly, and permits the fuel-air charge under pressure to pass into a storage zone 42.

The storage zone 42 is provided by a housing 44 which extends upwardly along the exterior of the upper cylinder-portion 14, providing a passage for the fuel-air, and also over the cylinder-head 46 of the upper cylinder-portion 14. A valve 47, the details and operation of which are now to be described, regulates the communication of the storage zone 42 with combustion chamber 48 which exists interiorly of the upper or power cylinder 14.

It will be observed that the valve 47 is biased in an upward direction, as shown by a tension spring 49, one end of which is connected to the stem 50 of the valve 47, and the other end of which is connected to an operating linkage 52. The linkage 52 is shown as fulcrumed by a pin 54 carried on a support post 56 supported on the housing 44.

The linkage 52 operatively extends to a location of convenient control by whatever control means are desired, for example, manually-controlled by the operator or automatically controlled in response to factors to which the linkage is made responsive. It will be observed that a linkage-actuation, which causes the right end of linkage 52 to be lowered, will cause a decrease in the spring 49 bias; while a linkage-actuation, which causes the right end of the linkage 52 to be raised, will cause an increase in spring 49 bias.

The open or closed state of the valve 47 is thus seen to depend upon the valve-opening force of the fuel-air pressure in the storage zone 42 and the valve-closing force provided by the pressure in the combustion chamber 48 of upper cylinder-portion 14 and the bias of spring 49. By adjustment of the bias of the spring 49, therefore, the valve 47 will close at whatever preignition pressure is desired in the combustion chamber 48, thus effectively making regulatable the compression ratio of the engine; and this adjustment can be achieved even while the engine is operating.

Axial movement of the valve-stem 50 is shown as guided by a retainer 58 shown mounted on the upper wall of the housing 44, downward travel of the valve 47 being shown as limited by a retainer pin 60 mounted on the valve-stem 50.

During upstroke of the piston 12, the valve-opening pressure of fuel-air in the storage zone 42 is sufficient to overcome the valve-closing forces of pressure in the combustion chamber 48 and the bias of spring 49; thus the fuel-air charge enters the combustion chamber 48 through the opening between the valve 47 and the valve seat 62 in the cylinder head 46. The open position of the valve 45 is schematically indicated by the broken line 64.

However, near the top of the upstroke of the piston 12, the pressure in the combustion chamber 48 is sufficient that, when added to the force exerted by the bias of spring 49, the valve 47 closes. This valve-closure is prior to any ignition in the combustion chamber 48. (The ignition means are yet to be described.)

Upon ignition of the charge in the combustion chamber 48, the explosion force will of course act on the head of piston-portion 18 to drive the piston 12 downwardly, achieving the power stroke of the engine, and the exhaust gasses will pass outwardly of the combustion chamber 48 through the exhaust port 65 which communicates a lower portion of the power cylinder 14 with an exhaust pipe 66. This downward or power stroke of the piston 12, however, also is the supply stroke of the lower piston-portion 20 for causing fuel-air to enter the supply cylinder 16 through the valve 29 and opening 32.

The subsequent upstroke of the piston 12 forces that new charge of fuel-air upwardly through the valve 40 and into the passage and storage zone 42 of the housing 44 and past the valve 47 into the combustion chamber 48 of the power cylinder 14, as described above. Scavenging is achieved during the initial portion of the piston upstroke, the location of the exhaust port 65 being above the head of the piston-portion 18 when it is in bottom dead-center position. Moreover, this elevated position of the exhaust port 65 provides that the combustion chamber 48 is vented during that portion of the upstroke of the piston 12, assuring that pressure in the combustion chamber 48 is insufficient (even with the spring-bias of spring 49) to effect valve-closure against the force of the fuel-air charge in the housing 44, during the desired time of entrance of a fuel-air charge into the combustion chamber 48.

The upper piston-portion 18 is shown as provided with a piston-ring 68, and the lower piston-portion 20 is shown as provided with a piston-ring 70; and an O-ring 72 is shown as carried by the upper cylinder-portion 14 adjacent its lower end, bearing against the smaller piston-portion 18, effecting a sealing operativity.

It will be noted that the upper piston-portion 18 is shown as provided with an intermediate body-member 74 of insulating material, reducing the conduction of heat downwardly from the combustion chamber 48 through upper piston-portion 18. Desirably, the overall heat is also reduced by a suitable water-jacket, which desirably extends over both the power cylinder 14 and the supply cylinder 16. Further cooling of the piston 12 and thus also of the fuel-air charge in the supply chamber 36 is desirably achieved by spraying oil under pressure upwardly against the head of the piston-portion 18, by known means such as the provision of ports in the upper portion of the connecting rod 24, through which oil may be sprayed under pressure created by the associated oil pump (not shown), the oil being delivered to the upper end of the connecting rod 24 by suitable passages (not shown) formed in the connecting rod.

An excess of pressure of fuel-air in the storage zone 42 is relieved by a relief valve 76 shown as located in the flange 30 of the power cylinder 14, which valve is downwardly-opening desirably of reed type of adjustable nature, which permits excess pressure of fuel-air in storage and delivery housing 44 to pass downwardly back into the supply chamber 36 through the opening 38 in the cylinder head 34.

The ignition means is shown as provided by electrodes 78 carried by the valve 47, the lower face 80 of the valve 47 being shown as of concave formation or nature, permitting the electrodes 78 to be disposed above the lower face of the cylinder head 46. The electrodes 78 are supplied with electric energy by a circuit 82 which is carried by the valve stem 50, internally thereof as shown, and the circuit 82 is electrically powered a flexible electric circuit 84 supplied with electric power in a suitably controlled manner as by a distributor (not shown).

The dished concavity of the valve-face 80, and the spark electrodes 78 being on the valve 47, permit the valve to be bigger than in other engines, for the need of cylinder head space for a separate sparkplug or other ignition device is avoided; and this achieves more volumetric and operational efficiency, because the longer valve-circumference provides a greater effective valve-passing passage-area for the fuel-air charge, eliminating the need of relatively long valve-travel required with smaller circumference valves. This, in addition to the sparking electrodes 78 being disposed above the bottom of the valve face 80 and above the lower face of the cylinder head 46, also permits the head of the power-piston 18 to come closer to the cylinder head 46, achieving higher compression ratios.

Advantages of both a two-cycle engine and a four-cycle engine are obtained, obtaining a power stroke for each cycle, forced lubrication, forced breathing and scavenging, obtaining a nature of supercharging, and obtaining an adjustable regulation of preignition combustion-chamber compression.

Accordingly, it will thus be seen from the foregoing description of the invention according to this illustrative embodiment, considered with the accompanying drawings, that the present invention provides a new and useful power means, having desired advantages and characteristics, and accomplishing its intended objects, including those hereinbefore pointed out and others which are inherent in the invention.

Modifications and variations may be effected without departing from the scope of the novel concepts of the present invention; accordingly, the invention is not limited to the specific form or arrangement of parts herein described or shown.

Moreover, terms and expressions of the description and claims are to be broadly construed. For example, the term "fuel-air" is to be interpreted to refer to any component or components of the combustible charge, here contemplating both fuel-air mixtures as by a carburetor, or fuel injection types; and terms like "head," "top," "upstroke," and the like are used to avoid repetition of alternatives, and it is not implied that the engine invention is limited to the upright vertical arrangement shown.

What is claimed is:

1. In an internal combustion engine having a power cylinder and a power piston,
  means for selectively varying preignition compression in said cylinder, comprising:
    a valve,
    the valve opening by movement inwardly with respect to said power cylinder,
    means supplying fuel-air under pressure to the said valve, and the pressure thereof exerting valve-opening force on said valve,
    the valve being urged to closed position by pressure in said power cylinder,
    biasing means biasing said valve to closed position,
    and means for selectively varying the bias of the said biasing means,
    the said fuel-air supplying means including a storage region of fuel-air operatively adjacent said valve, and the said supplying means also including check-valve means which maintains pressure in said storage region in spite of pressure-variations of said supplying means upstream of said check-valve means.

2. The invention as set forth in claim 1 in a combination in which the said biasing means is a spring means operatively connected to said valve, and movable means are provided for controlling the bias of said spring means.

3. The invention as set forth in claim 1 in a combination in which the said valve carries electrodes operatively facing the power cylinder providing for igniting the fuel-air charge therein.

4. The invention as set forth in claim 3 in a combination including a cylinder head, and in which the face of said valve which faces inwardly with respect to the power cylinder is formed concave in nature, and the said electrodes are carried adjacent said concave-nature face to provide that when said valve is in closed position the said electrodes are located above the lower face of the said cylinder head.

5. The invention as set forth in claim 3 in a combination including a cylinder, and in which the said electrodes are carried in a position adjacent such valve to provide that when said valve is in closed position the said electrodes are located above the lower face of the said cylinder head.

6. The invention as set forth in claim 1 in a combination in which there is provided a fuel-air supply cylinder and a fuel-air supply piston, the said supply piston being operatively connected to the said power piston and providing that operation of said power piston causes the said supply piston to move relatively to the said supply cylinder and thereby supply fuel-air under pressure to the region of the said valve.

7. The invention as set forth in claim 6 in a combination in which there is provided a passage communicating the said supply cylinder with the region of the said valve, and a check valve is provided in said passage opening in the direction toward the said valve.

8. The invention as set forth in claim 7 in a combination in which there is provided a pressure relief valve in said passage opening in the direction of said supply cylinder.

9. The invention as set forth in claim 7 in a combination in which the operation of the said first-mentioned valve is controlled by force differential between valve-opening force of pressure in said passage and valve-closing force of said biasing means and of the pressure in the said power cylinder.

References Cited
UNITED STATES PATENTS

| | | | |
|---|---|---|---|
| 1,393,174 | 10/1921 | Shepard | 123—169 |
| 603,125 | 4/1898 | Carnes | 123—73 |
| 607,536 | 7/1898 | Bates | 123—65 |
| 720,759 | 2/1903 | Tuttle | 123—71 |
| 1,210,286 | 12/1916 | Ewing | 123—65 |
| 2,183,116 | 12/1939 | Coates | 123—65 |
| 2,394,177 | 2/1946 | Hoern | 123—188 |

FOREIGN PATENTS 15,758 AD1914 Great Britain.

WENDELL E. BURNS, *Primary Examiner.*